(12) United States Patent
Menozzi et al.

(10) Patent No.: US 9,505,541 B2
(45) Date of Patent: Nov. 29, 2016

(54) USE OF PROTECTED N-HYDROXYIMIDE DERIVATES AND TRANSITION METAL AS OXYGEN SCAVENGER SYSTEM IN TRANSPARENT POLYOLEFIN FILMS

(71) Applicant: BASF SE, Ludwigshafen (DE)

(72) Inventors: Edoardo Menozzi, Basel (CH); Massimiliano Sala, Castelnuovo Rangone (IT); Enrico Galfre, Basel (CH)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/636,490

(22) Filed: Mar. 3, 2015

(65) Prior Publication Data

US 2015/0217923 A1 Aug. 6, 2015

Related U.S. Application Data

(63) Continuation of application No. 13/511,162, filed as application No. PCT/EP2010/068372 on Nov. 29, 2010, now abandoned.

(30) Foreign Application Priority Data

Dec. 2, 2009 (EP) .................... 09177738

(51) Int. Cl.
| | | |
|---|---|---|
| *C08K 5/3437* | (2006.01) | |
| *C08K 5/098* | (2006.01) | |
| *B65D 81/26* | (2006.01) | |
| *C08K 5/3417* | (2006.01) | |
| *C08K 5/42* | (2006.01) | |
| *C08L 23/08* | (2006.01) | |

(52) U.S. Cl.
CPC ............ *B65D 81/266* (2013.01); *C08K 5/098* (2013.01); *C08K 5/3417* (2013.01); *C08K 5/3437* (2013.01); *C08K 5/42* (2013.01); *C08L 23/0815* (2013.01); *C08K 2201/012* (2013.01)

(58) Field of Classification Search
CPC .. B65D 81/266; C08K 5/098; C08K 5/3417; C08K 5/3437; C08K 5/42; C08K 2201/012; C08L 23/0815
See application file for complete search history.

(56) References Cited

U.S. PATENT DOCUMENTS

| | | |
|---|---|---|
| 4,104,192 A | 8/1978 | Yoshikawa et al. |
| 4,856,650 A | 8/1989 | Inoue |
| 4,992,410 A | 2/1991 | Cullen et al. |
| 5,153,038 A | 10/1992 | Koyama et al. |
| 5,744,056 A | 4/1998 | Venkateshwaran |
| 5,776,361 A | 7/1998 | Katsumoto et al. |
| 6,369,148 B2 | 4/2002 | Chiang et al. |
| 6,586,514 B2 | 7/2003 | Chiang et al. |
| 2006/0116452 A1 | 6/2006 | Tsuji et al. |
| 2007/0098936 A1 | 5/2007 | Tung et al. |
| 2009/0286060 A1 | 11/2009 | Sala |
| 2011/0017611 A1 | 1/2011 | Menozzi |
| 2011/0105639 A1 | 5/2011 | Menozzi |
| 2012/0175555 A1 | 7/2012 | Menozzi et al. |
| 2012/0187345 A1 | 7/2012 | Menozzi et al. |

FOREIGN PATENT DOCUMENTS

| | | |
|---|---|---|
| EP | 1423456 | 6/2004 |
| EP | 1650265 | 4/2006 |
| WO | 9948963 | 9/1999 |
| WO | 05010101 | 2/2005 |
| WO | 2006/089895 | 8/2006 |
| WO | 2007028731 | 3/2007 |

OTHER PUBLICATIONS

Copending U.S. Appl. No. 13/511,231, filed May 22, 2012.
English Language Abstract of JP 54158386.
English Language Abstract of JP 56121634.
Patent Abstracts of Japan 56-60642d.
Patent Abstracts of Japan 57024634.
Patent Abstracts of Japan 2000-290312.
J. Org. Chem. vol. 61, (1996) pp. 4520-4526.
J. of Synthetic Organic Chem. vol. 59, No. 1, pp. 4-12 (2001).
Copending U.S. Appl. No. 13/511,237, filed May 22, 2012.

*Primary Examiner* — Kriellion Sanders
*Assistant Examiner* — Vickey Nerangis
(74) *Attorney, Agent, or Firm* — Oblon, McClelland, Maier & Neustadt, L.L.P.

(57) ABSTRACT

An oxygen-scavenging composition containing (I) a polymeric resin, (II) an organic oxidation additive based on a cyclic oxyimide, (III) a metal salt, preferably a transition metal salt, (IV) a sacrificial oxidizable substrate, and optionally, (V) an additional component; wherein components (I) and (IV) are different.

8 Claims, No Drawings

USE OF PROTECTED N-HYDROXYIMIDE DERIVATES AND TRANSITION METAL AS OXYGEN SCAVENGER SYSTEM IN TRANSPARENT POLYOLEFIN FILMS

This application is a continuation of U.S. application Ser. No. 13/511,162, which is a National Stage of PCT/EP2010/068372 filed Nov. 29, 2010 and claims the benefit of EP 09177738.3 filed Dec. 2, 2009.

There are many products which have to be kept in a closed volume or packaged with little or almost no oxygen. These oxygen-sensitive products include pharmaceuticals, food products, meats, beverages, etc which are susceptible for degradation due to the presence of oxygen. Limiting the exposure to oxygen provides a means to maintain and enhance the quality and shelf-life of the packaged product. The removal of oxygen from the packaged foods and building barriers against oxygen penetration during storage represents an important objective for the food packaging technologist. For example packaging a food product in a package capable of minimizing oxygen exposure is a means to maintain the quality of the packaged product over an extended time and to retard spoilage of the product so that it is maintained in inventory longer without wastage and the need of restocking and replacement.

In the food packaging industry, several techniques have been developed to limit oxygen sensitive packaged materials to oxygen exposure. Such techniques include the use of barrier material (with low permeability to oxygen) as part of the packaging; the inclusion of some items capable of consuming oxygen other then the packaging material (through the use of sachets with material capable of reacting with oxygen); and the creation of a reduced oxygen environment within the package (e.g. modified atmosphere packaging—MAP- and vacuum packaging). Even if each of the above techniques has its place in the industry, it is well recognized that the inclusion of an oxygen scavenger as a part of the packaging article is one of the most desirable way of limiting oxygen exposure.

Product sensitive to oxygen, particularly foods, beverages and medicines, deteriorate or spoil in the presence of oxygen. One approach to reducing these difficulties is to package such products with packaging materials containing at least one layer of a so-called "passive" gas barrier film that can act as a physical barrier to transmission of oxygen but does not react with oxygen. Films obtained from ethylene vinyl alcohol copolymer (EVOH) or polyvinylidene dichloride (PVDC) are commonly used for this purpose due to their excellent oxygen barrier properties. By physically blocking transmission of oxygen, these barrier films can maintain over time the initial oxygen levels within a package. Because passive barrier films can add cost to a packaging construction and do not reduce levels of oxygen already present in the packaging construction, however, there is a need for effective, lower cost alternatives and improvements.

An approach to achieving or maintaining a low oxygen environment inside a package is to use a packet containing an oxygen absorbent material. The packet, also sometimes referred to as a pouch or sachet, is placed in the interior of the package along with the product. Sakamoto et al. discloses oxygen absorbent packets in Japan Laid Open Patent Application No. 121634/81 (1981). A typical ingredient used in the oxygen scavenger carried in the packet is reduced iron powder which can react with oxygen to form ferrous oxide or ferric oxide, as disclosed in the U.S. Pat. No. 4,856,650. Also, is known to include in the packet, along with iron, a reaction promoter such as sodium chloride, and a water-absorbing agent, such as silica gel, as described in the U.S. Pat. No. 4,992,410. Japan Laid Open Patent Application No. 82-24634 (1982) discloses an oxygen absorber composition comprising 100 parts by weight (pbw) iron powder, 2 to 7 pbw ammonium chloride, 8 to 15 pbw aqueous acid solution and 20 to 50 pbw of a slightly water soluble filler such as activated clay. Japan Laid Open Patent Application No. 79-158386 (1979) discloses an oxygen arresting composition comprising a metal, such as iron, copper or zinc, and optionally, a metal halide such as sodium chloride or zinc chloride at a level of 0.001 to 100 pbw to 1 pbw of metal and a filler such as clay at a level of 0.01 to 100 pbw to 1 pbw of metal.

Although oxygen absorbent or scavenger materials used in packets can react chemically with oxygen in the package, also sometimes referred to as "headspace oxygen", they do not prevent external oxygen from penetrating into the package. Therefore, it is common for packaging in which such packets are used to include additional protection such as wrappings or passive barrier films of the type described above. This adds costs to product costs. With many easy-to-prepare foods, another difficulty with oxygen scavenger packets is that consumers may mistakenly open them and consume their contents together with the food. Moreover, the extra manufacturing step of placing a packet into a container can slow production. Further, oxygen absorbent packets are not useful with liquid products.

In view of these disadvantages and limitation, it has been proposed to incorporate directly into the walls of a packaging article a so-called "active" oxygen absorber, i.e., one that reacts with oxygen. Because such a packaging article is formulated to include a material that reacts with oxygen permeating its walls, the packaging is said to provide an "active-barrier" as distinguished from passive barrier films which block transmission of oxygen but do not react with it. Active-barrier packaging is an attractive way to protect oxygen-sensitive products because it not only can prevent oxygen from reaching the product from the outside but also can absorb oxygen present within a container.

One approach for obtaining active-barrier packaging is to incorporate a mixture of an oxidizable metal (e.g., iron) and an electrolyte (e.g., sodium chloride) into a suitable resin, melt process the result into monolayer or multilayer sheets or films and form the resulting oxygen scavenger-containing sheets or films into rigid or flexible containers or other packaging articles or components. This type of active-barrier is disclosed in Japan Laid Open Patent Application No. 56-60642 (1981), directed to an oxygen-scavenging sheet composed of a thermoplastic resin containing iron, zinc or copper and a metal halide. Disclosed resins include polyethylene and polyethylene terephthalate. Sodium chloride is the preferred metal halide. Component proportions are such that 1 to 500 parts metal halide are present per 100 parts resin and 1 to 200 parts metal halide are present per 100 part metal. Similarly, the U.S. Pat. No. 5,153,038 discloses plastic multilayer vessels of various layer structures formed from a resin composition formed by incorporating an oxygen scavenger, and optionally a water absorbing agent, in a gas barrier resin. The oxygen scavenger can be a metal powder such as iron, low valence metal oxides or reducing metal compounds. The oxygen scavenger can be used in combination with an assistant compound such as a hydroxide, carbonate, sulfite, thiosulfite, tertiary phosphate, secondary phosphate, organic acid salt or halide of an alkali metal or alkaline earth metal. The water absorbing agent can be an inorganic salt such as sodium chloride, calcium chloride, zinc chloride, ammonium chloride, ammonium sulfate, sodium sulfate, magnesium sulfate, disodium hydrogenphosphate, sodium dihydrogenphosphate, potassium carbonate or sodium nitrate. The oxygen scavenger can be present at 1 to 1000 weight-% based on weight of the barrier resin. The water absorbing agent can be present at 1 to 300 weight-% based on weight of the barrier resin.

One difficulty with scavenger systems incorporating an oxidizable metal (e.g., iron) and a metal halide (e.g., sodium chloride) into a thermoplastic layer is the inefficiency of the oxidation reaction. To obtain sufficient oxygen absorption in active-barrier packaging, high loadings of scavenger composition are often used. This typically requires that sheets, films and the other packaging layers or wall structures containing a scavenging composition to be relatively thick. This, in turn, contributes to cost of packaging material and may preclude attainment of thin packaging films having adequate oxygen-scavenging capabilities.

Another oxygen-scavenging composition, disclosed in the U.S. Pat. No. 4,104,192, comprises a dithionite and at least one compound having water of crystallization or water of hydration. Listed among these compounds are various hydrated sodium salts, including carbonate, sulfate, sulfite and phosphates; sodium pyrophosphate decahydrate is specifically mentioned. As disclosed in Table 1, Example 1 of the patent, sodium pyrophosphate decahydrate was the least effective of the compounds tested. In addition, use of hydrate containing compounds may not suitable in oxygen-scavenging resins that require high temperature processsing. The U.S. Pat. No. 5,744,056, U.S. Pat. No. 6,369,148 and U.S. Pat. No. 6,586,514 describe an oxygen scavenging composition comprising an oxidizable metal component, an electrolyte component, and a non-electrolytic acidifying component that is thermally stable at thermoplastic resin melt fabrication temperatures. WO2006089895 discloses a similar system wherein the electrolytic component participating in the oxidation reaction is obtained by hydrolysis of a Lewis acid salts and/or theirs adducts.

One difficulty with scavenger systems of this type is the relative inefficiency of the oxidation reaction within the polymer matrix. In fact one molecule of iron generally absorbs only one molecule of oxygen thus the scavenger active system must be employed usually at high loading, leading to cost, compatibility, transparency and color issues. In EP-A-1423456, for example, the concentration of the metal is limited to less than 0.25% in order to obtain a more transparent plastic object, limiting significantly its effectiveness.

A different approach to oxygen scavenger technology employed in synthetic thermoplastics such as polyolefin homo- and copolymers include the use of conventional degradation additives such as transition metal salts based on cobalt, copper or nickel which work well in many applications were oxygen uptake is required. In this case the polymer matrix itself act as oxidizable substrate and the oxygen scavenger process has to proceed via oxidation reactions along the carbon-carbon polyolefin chain catalyzed by the redox cycle of polyvalent metal ions. Many countries have however restrictive regulations on the use of such transition metals for reasons of environmental concern.

A catalytic systems for the oxidation of organic substrates based on N-hydroxy phthalimide (NHPI) both with and without metal salts as co-catalysts is described in *J. Org. Chem.* 1996, 61, 4520-4526.

The Chemistry Vol. 56, No. 7, 18-23, 2001 and Journal of Synthetic Organic Chemistry, Vol. 59, No. 1, 4-12, 2001 disclose that an N-hydroxyimide compound that coexists with various metal salts reacts with oxygen contained in the air to serve as an oxidation catalyst for alkane, alkene, and alcohol. WO 2005/010101 is related to the use of such autoxidation promoters for oxygen absorbents containing oxidizable polymers for packaging materials.

JP-A-2000-290312 describes a method in which various polymers are denatured with gas containing oxygen atoms using an N-hydroxyimide compound as a catalyst. This method allows a polar group to be introduced efficiently into a polymer without cutting the main chain of the polymer and as a result, a polymer can be obtained that is excellent in antistatic property.

These oxidation reactions, however, are allowed to occur in the presence of a polar solvent such as acetic acid, etc., i.e. in the presence of a solvent that absorbs oxygen actively. These reactions are oxidation reactions that occur between a liquid phase and a liquid phase or between a solid phase and a liquid phase and therefore are predicated on the intervention of transition metal and the flow of a catalyst that occurs in the liquid. On the other hand, it is required that the oxygen-absorbing material maintains its solid state even when it absorbs oxygen. Accordingly, the reaction that is required to take place in the oxygen-absorbing material is the reaction that occurs between the solid phase and the vapor phase. However, possibilities of the occurrence of such a reaction have not been studied at all.

Thus, while a variety of approaches to maintaining or reducing oxygen levels in packaged items have been advanced, there remains a need for improved oxygen-scavenging composition and packaging materials utilizing the same.

An object of the present invention is therefore to provide improved oxygen-scavenging compositions and packagings. Another object is to provide low costs, oxygen-scavenging compositions of improved efficiency. Another object is to provide oxygen scavenging composition that can be used effectively, even at relatively low levels, in a wide range of active-barrier packaging films and sheets, including laminated and coextruded multilayer films and sheets. Another object is ti provide active-barrier packaging containers that can increase the shelf-life of oxygen-sensitive products by slowing the passage of external oxygen into the container, by absorbing oxygen present inside the container or both. Other objects will be apparent to those skilled in the art.

The problem which was solved within this invention required the use of thermal stable protected cyclic N-hydroxyimide derivatives, transition metal catalyst in combination with an oxidazable substrate like, but not limited at, polyterpene resin based on alfa and/or beta pinene and/or d-limonene used as organocatalytic oxidation additives for transparent food packaging oxygen scavenger application. Besides several examples which describe the use of the catalysts per se, examples of suitable catalyst precursors are also given which make use of light, humidity, and/or heat to trigger the initiation of the degradation process. The catalytic role of the organic oxidation promoter is summarized in the scheme below considering N-hydroxyphthalimide as example compound:

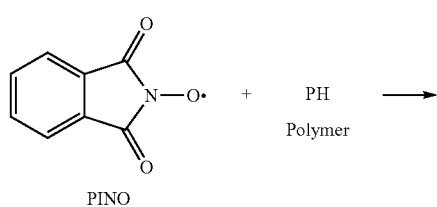

PINO

-continued

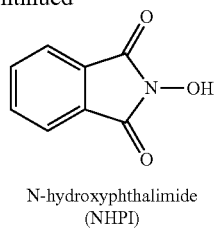

N-hydroxyphthalimide
(NHPI)

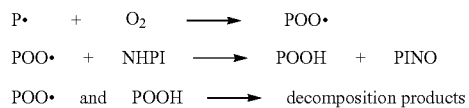

By designing cyclic N-hydroxyimide derivatives according to the resin needs, the polarity can be easily adjusted changing the substitution pattern of the basic nucleus. Unpolar resins such as polyolefins will require lipophilic substituents, such as branched and linear alkyl chains, whereas cyclic N-hydroxyimides designed for more polar resins such as polyvinyl alcohol may be modified attaching more hydrophilic groups such as polyethylene glycol or polyhydroxy compounds such as sugars.

Particular attention is given when the hydrogen of the N-hydroxy moiety of the cyclic imides is replaced by different substituents. For this class of molecules the formation of the active nitroxyl radical species, which is active towards the oxidation of organic substrates, can be triggered by heat, light and/or humidity, wherein the oxidation of the polymer can occur independently both in presence or in absence of a transition metal catalyst, other cocatalysts, radical initiators, photo-sensitisers or -initiators, primary oxidants or mixture of thereof.

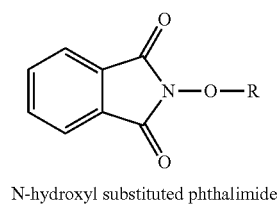

N-hydroxyl substituted phthalimide

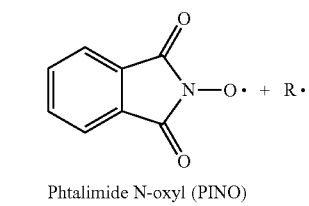

Phtalimide N-oxyl (PINO)

R = H, alkyl, acyl, O$_2$S—R'
Conditions: light irradiation and/or and/or heat and/or humidity The following oligomeric and monomeric molecules represent examples of the above concept: Monomeric NHPI derivatives:

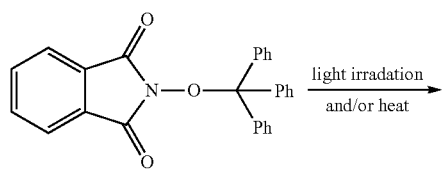

-continued

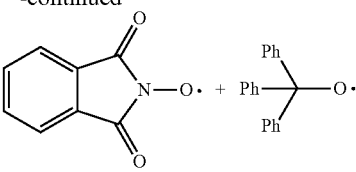

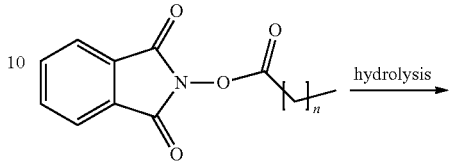

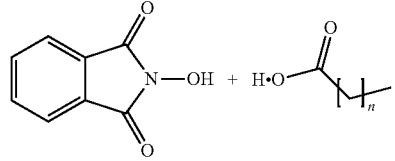

Oligomeric NHPI Derivatives:

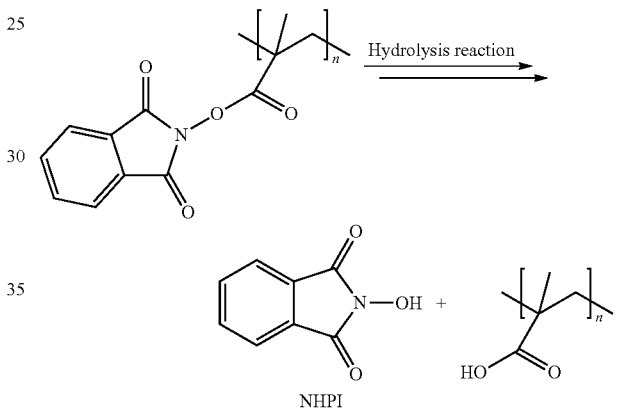

The final products can be any type of plastic product for food packaging application, which needs enhanced oxygen scavenger activities. For example, the polymer component may be used to manufacture mono or multilayer plastic films, sheets, laminates, trays, bottles, styrofoam cups, blister packages, boxes, package wrappings. The articles may be manufactured by any process available to those of ordinary skill in the art including, but not limited to, extrusion, extrusion blowing, film casting, film blowing, calendering, injection molding, blow molding, compression molding, thermoforming, spinning, blow extrusion and rotational casting.

The cyclic N-hydroxyimide derivatives, transition metal catalyst, oxidazable substrate and optionally other additional components can be admixed with the polymer component either simultaneously or in succession, or also immediately prior to the actual processing step.

Thus the present invention relates to an oxygen-scavenging composition comprising:

(I) A polymeric resin preferably a thermoplastic polymers as:
homo- and copolymers of olefin monomers such as ethylene and propylene, but also higher 1-olefins such as 1-butene, 1-pentene, 1-hexene or 1-octen. Preferred is polyethylene LDPE and LLDPE, HDPE and polypropylene;

homo- and copolymers of olefin monomers with diolefin monomers such as butadiene, isoprene and cyclic olefins such as norbornene;

copolymers of one ore more 1-olefins and/or diolefins with carbon monoxide and/or with other vinyl monomers, including, but not limited to, acrylic acid and its corresponding acrylic esters, methacrylic acid and its corresponding esters, vinyl acetate, vinyl alcohol, vinyl ketone, styrene, maleic acid anhydride and vinyl chloride;

polyvinyl alcohol;

(II) An organic oxidation additives based on a cyclic oxyimide core as defined below, particularly on the compounds given in the following tables:

Example 1
N-(trityloxy)-phthalimide

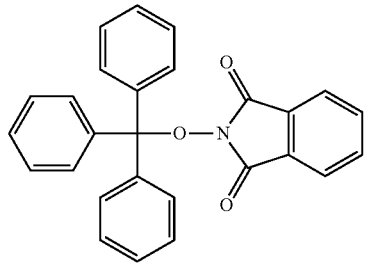 [SMILES: O=C1c2ccccc2C(=O)N1OC(c1ccccc1)(c1ccccc1)c1ccccc1]

Example 2
N-(stearoyloxy)phthalimide

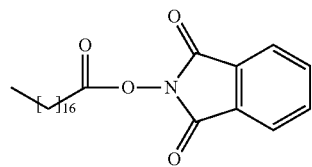

Example 3
N-(toluene-4-sulfonyloxy)-phthalimide

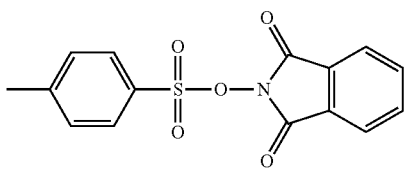 [SMILES: Cc1ccc(S(=O)(=O)ON2C(=O)c3ccccc3C2=O)cc1]

Example 4
N-(2-benzoylbenzoyloxy)-phtalimide

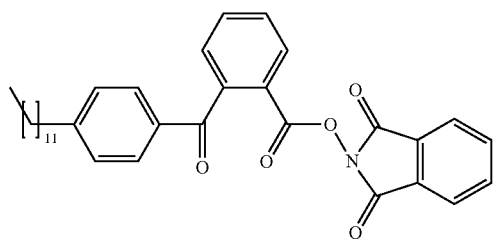

Example 5
N,N'-dihydroxypyromellitic diimide

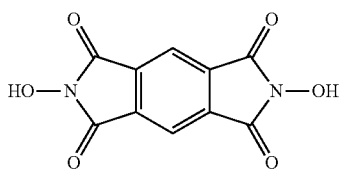 [SMILES: O=c1c2cc3c(=O)n(O)c(=O)c3cc2c(=O)n1O]

Example 6
N,N'-distearoyloxypyromelitimide

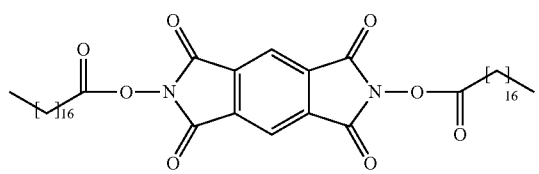

Some further Examples are:

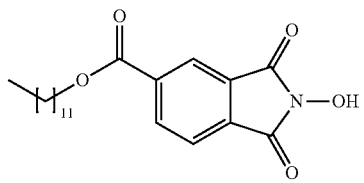

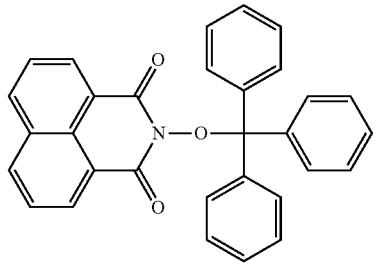

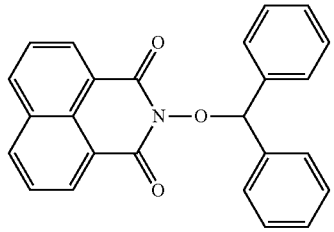

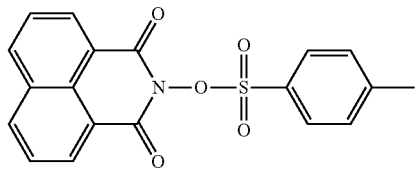

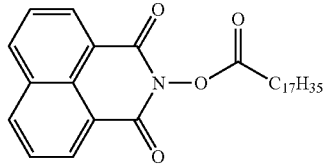

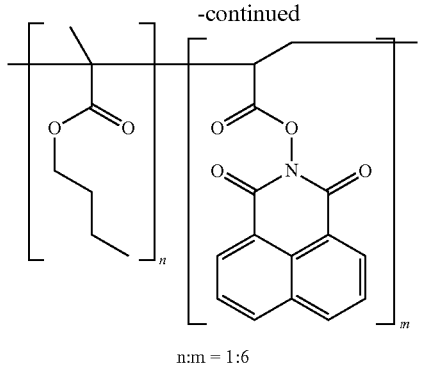

n:m = 1:6

The oxidation additive(s) may be present in total in a concentration from 0.001-10 wt %, preferably 0.01-5 wt % and most preferably 0.1-5 wt % based on the polymeric resin;

(III) Metal salts based on Co, Ce, Mn, Cu, Ni, Vd. Preferably these salts are metal salts of fatty acids with a carbon number raging from $C_{12}$ to $C_{36}$. Most preferred are metal carboxylates of palmitic ($C_{16}$), stearic ($C_{18}$), oleic ($C_{18}$), linolic ($C_{18}$) and linoleic ($C_{18}$) acids. Preferably the transition metal salt is Manganese which may be present in a total concentration from 0.001-10 wt %, preferably 0.01-5 wt % and most preferably 0.1-5 wt % based on the polymeric resin. Also possible are aromatic acids such as benzoic acid. Examples for the use of these salts are given in U.S. Pat. No. 3,840,512 and U.S. Pat. No. 4,101,720;

(IV) Sacrificial oxidizable substrates like polybutadiene, polyester, squalane, squalene, polystyrene, poly-limonene, poly alpha pinene, poly beta pinene, polynorbornene, polylactic acid, mixture of linear and branched alkyl chains alcohol (R: $C_6$-$C_{30}$) can be employed. Preferably these oxidizable substrates are present in a total concentration from 0.001-10 wt %, preferably 0.01-5 wt % and most preferably 0.1-5 wt % based on the polymeric resin;

and optionally, (V) additional components.

The optional additional components includes:
fillers and reinforcing agents such as calcium carbonate, silicas, glass fibres, glass bulbs, talc, kaolin, mica, barium sulfate, metal oxides and hydroxides, carbon black, graphite, wood flour, flours of other natural products, synthetic fibers, stearates used as fillers such as calcium stearate on zinc stearate;
pigments such as carbon black, titanium dioxide in its rutil or anatase forms, and other color pigments;
light stabilizers, antioxidants and/or further light stabilizers such as e.g.:

1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methyl heptadec-1'-yl)phenol, 2,4-dimethyl-6-(1'-methyltridec-1'-yl)phenol and mixtures thereof.

2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

4. Tocopherols, for example α-tocopherol, β-tocopherol, γ-tocopherol, δ-tocopherol and mixtures thereof (vitamin E).

5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy2-methylphenyl)-4-n-dodecylmercaptobutane, 1,1,5,5-tetra-(5-tert-butyl-4-hydroxy-2-methylphenyl)pentane.

7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl) malonate, di-dodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl) malonate.

9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4, 6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl)isocyanurate.

11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzyiphosphonic acid.

12. Acylaminophenols, for example 4-hydroxylauranilide, 4-hydroxystearanilide, octyl N-(3,5-di-tert-butyl-4-hydroxyphenyl)carbamate.

13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

14. Esters of β-(5-tert-butyl-4-hydroxy-3-methylphenyl) propionic acid with mono- or polyydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]undecane.

15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxylethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

17. Amides of β-(3,5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

18. Ascorbic acid (vitamin C)

19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetra-methyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenyla mines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-di-methyl-4H-1,4-benzothiazine, phenothiazine, a mixture of mono- and dialkylated tert-butyl/tertoctylphenothiazines, a mixture of mono- and dialkylated tert-octyl-phenothiazines, N-allylphenothiazine, N,N,N',N'-tetraphenyl-1,4-diaminobut-2-ene.

20. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetra methylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

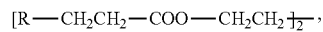

where R=3'-tert-butyl-4'-hydroxy-5'-2H-benzotriazol-2-ylphenyl, 2-[2'-hydroxy-3'-(α,α-dimethylbenzyl)-5'-(1,1,3, 3-tetramethylbutyl)-phenyl]-benzotriazole; 2-[2'-hydroxy-3'-(1,1,3,3-tetramethylbutyl)-5'-(α,α-dimethylbenzyl)-phenyl]benzotriazole.

21. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

22. Esters of substituted and unsubstituted benzoic acids, for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

23. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate, N(β-carbomethoxy-β-cyanovinyl)-2-methylindoline, neopentyl tetra(α-cyano-β,β-diphenylacrylate.

24. Sterically hindered amines, for example carbonic acid bis(1-undecyloxy-2,2,6,6-tetra-methyl-4-piperidyl)ester, bis (2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione, a mixture of 4-hexadecyloxy and 4-stearyloxy-2,2,6,6-tetramethyl piperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly [methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis [(1-cyclohexyloxy-2,2,6,6-piperidine-4-yl)butylamino]-6-chloro-s-triazine with N,N'-bis(3-aminopropyl) ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-penta methylpiperazine-3-one-4-yl)amino)-s-triazine.

25. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

26. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(hydroxy-4-octyloxyphenyl)-4,6-bis(4-methylphenyl)-1,3,5-triazine, 2-(2-hydroxy-4-dodecyloxyphenyl)-4,6-bis (2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine.

processing additives such as antislip/antiblock additives, plasticizers, optical brighteners, antistatic agents and blowing agents;

antioxidants may be present in amounts to stabilize the polymer during processing and forming steps, however large quantities are undesired in order not to prevent degradation.

The present invention relates in particular to a polymer article having accelerated oxygen scavenger properties triggered by light and/or heat and/or humidity and made of a composition containing:

(A) a natural and/or a synthetic polymer, preferably based on homo- and copolymers of olefin monomers and (B) a degradation accelerator based on a cyclic oxyimide of the formula (I)

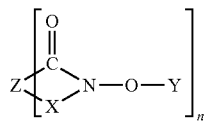
(I)

wherein
n is 1, 2 or 4;
X is >C=O, >S(O)$_2$ or >C(X$_1$)(X$_2$);
X$_1$ and X$_2$ independently of one another are hydrogen, C$_1$-C$_{20}$alkyl, C$_3$-C$_{12}$cycloalkyl unsubstituted or substituted by 1, 2 or 3 identic or different C$_1$-C$_4$alkyl; or phenyl unsubstituted or substituted by 1, 2 or 3 C$_1$-C$_4$alkyl;
Y is C$_1$-C$_{30}$alkyl, C$_2$-C$_{30}$alkenyl, C$_3$-C$_{12}$cycloalkyl unsubstituted or substituted by 1, 2 or 3 C$_1$-C$_4$alkyl; C$_5$-C$_{12}$cycloalkenyl unsubstituted or substituted by 1, 2 or 3 C$_1$-C$_4$alkyl; a bicyclic or tricyclic hydrocarbyl having 6 to 10 carbon atoms, C$_7$-C$_9$phenylalkyl unsubstituted or substituted on the phenyl by 1, 2 or 3 C$_1$-C$_4$alkyl; diphenylmethyl unsubstituted or substituted on the phenyl by 1, 2 or 3 C$_1$-C$_4$alkyl; triphenylmethyl unsubstituted or substituted on the phenyl by 1, 2 or 3 C$_1$-C$_4$alkyl; C$_2$-C$_{30}$acyl, —COOY$_0$, C$_1$-C$_{30}$sulfonyl, —Si(Y$_1$)$_3$ or —Si(OY$_2$)$_3$;
Y$_0$, Y$_1$ and Y$_2$ independently of one another are hydrogen, C$_1$-C$_{18}$alkyl, C$_3$-C$_{18}$alkenyl, C$_3$-C$_{12}$cycloalkyl which is unsubstituted or substituted by 1, 2 or 3 C$_1$-C$_4$alkyl; phenyl which is unsubstituted or substituted by 1, 2 or 3 C$_1$-C$_4$alkyl; or C$_7$-C$_9$phenylalkyl which is unsubstituted or substituted on the phenyl by 1, 2 or 3 C$_1$-C$_4$alkyl;
and
Z is an organic radical;
with the provisos that
(1) when Y is C$_1$-C$_{30}$alkyl, C$_2$-C$_{30}$alkenyl or C$_1$-C$_{30}$sulfonyl, component (A) is a polyolefin homo- or copolymer or a blend of a polyolefin homo- or copolymer with another synthetic polymer; and
(2) when n is 2 or 4 and, at the same time, component (A) is a polyolefin homo- or copolymer or a blend of a polyolefin homo- or copolymer with another synthetic polymer, Y is additionally hydrogen.

The radical Y is preferably different from hydrogen.

According to one of the preferred embodiments, Z is an organic radical containing one or more aromatic groups.

When n is 1, Z is in particular a group of the formula (I-a), (I-b), (I-c), (I-d), (I-e), (I-f), (I-g), (I-h), (I-i), (I-j), (I-k), (I-l), (I-m) or (I-n)

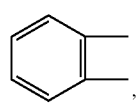
(I-a)

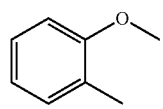
(I-b)

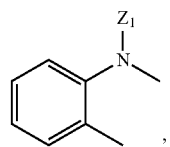
(I-c)

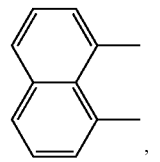
(I-d)

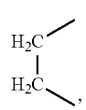
(I-e)

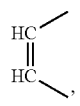
(I-f)

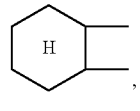
(I-g)

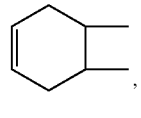
(I-h)

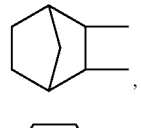
(I-i)

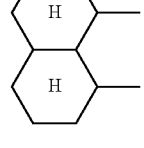
(I-j)

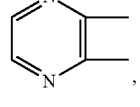
(I-k)

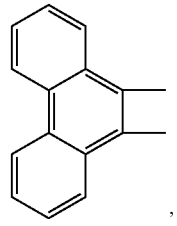
(I-l)

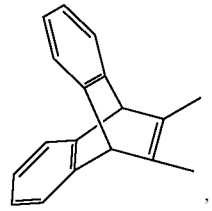
(I-m)

(I-n)

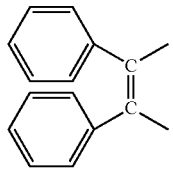

the aromatic rings of the formulae (I-a) to (I-d) and (I-k) to (I-n) and the residues of the formulae (I-e) to (I-j) are optionally substituted by one or more radicals selected from the group consisting of hydroxy, $C_1$-$C_{30}$alkyl, $C_1$-$C_{30}$alkyloxy, $C_2$-$C_{30}$ alkenyl, $C_2$-$C_{30}$alkenyloxy, $C_3$-$C_{12}$cycloalkyl unsubstituted or substituted by 1, 2 or 3 $C_1$-$C_4$alkyl; $C_3$-$C_{12}$cycloalkyloxy unsubstituted or substituted by 1, 2 or 3 $C_1$-$C_4$alkyl; $C_6$-$C_{18}$aryl, $C_6$-$C_{18}$ aryloxy, $C_2$-$C_{30}$carboxylate, $C_2$-$C_{30}$carboxamide, $C_2$-$C_{30}$acyloxy, $C_1$-$C_{30}$acyl, $C_1$-$C_{30}$sulfonyl, —S—$Z_{100}$, —S(O)$_2$(N($Z_{101}$)$_2$), —N($Z_{102}$)$_2$, —F, —Cl, —Br, —NO$_2$ or —COOH;

$Z_{100}$, $Z_{101}$, $Z_{102}$ and $Z_1$ independently of one another are hydrogen, $C_1$-$C_{18}$ alkyl, $C_3$-$C_{18}$alkenyl, $C_3$-$C_{12}$cycloalkyl which is unsubstituted or substituted by 1, 2 or 3 $C_1$-$C_4$alkyl; phenyl which is unsubstituted or substituted by 1, 2 or 3 $C_1$-$C_4$alkyl; or $C_7$-$C_9$phenylalkyl which is unsubstituted or substituted on the phenyl by 1, 2 or 3 $C_1$-$C_4$alkyl; and when n is 2, Z is in particular a group of the formula (II-a), (II-b), (II-c) or (II-d), (II-a)

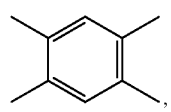

(II-b)

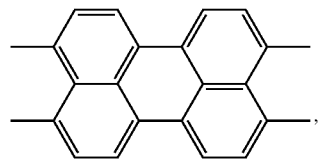

(II-c)

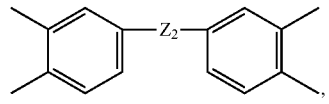

(II-d)

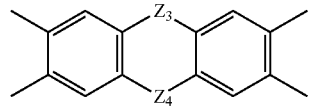

the aromatic rings of the formulae (II-a) to (II-c) are optionally substituted by one or more radicals selected from the group consisting of hydroxy, $C_1$-$C_{30}$alkyl, $C_1$-$C_{30}$alkyloxy, $C_2$-$C_{30}$ alkenyl, $C_2$-$C_{30}$alkenyloxy, $C_3$-$C_{12}$cycloalkyl unsubstituted or substituted by 1, 2 or 3 $C_1$-$C_4$alkyl; $C_3$-$C_{12}$cycloalkyloxy unsubstituted or substituted by 1, 2 or 3 $C_1$-$C_4$alkyl; $C_6$-$C_{18}$aryl, $C_6$-$C_{18}$ aryloxy, $C_2$-$C_{30}$carboxylate, $C_2$-$C_{30}$carboxamide, $C_2$-$C_{30}$acyloxy, $C_1$-$C_{30}$acyl, $C_1$-$C_{30}$sulfonyl, —S—$Z_{100}$, —S(O)$_2$(N($Z_{101}$)$_2$), —N($Z_{102}$)$_2$, —F, —Cl, —Br, —NO$_2$ or —COOH; $Z_2$ is >C=O, —O—, —S—, >N—$R_1$, >S=O or —S(O)$_2$—, $C_3$-$C_{30}$diacyl, $C_3$-$C_{30}$di(acyloxy), $C_3$-$C_{45}$dicarboxylate, $C_3$-$C_{45}$di(carboxamide), diamine or diamide;

$Z_3$ and $Z_4$ independently of one another are >C=O, —O—, —S—, >N—$R_2$, >S=O or —S(O)$_2$—;

$R_1$ and $R_2$ independently of one another are hydrogen, $C_1$-$C_{18}$alkyl, $C_3$-$C_{18}$alkenyl, $C_3$-$C_{12}$cycloalkyl which is unsubstituted or substituted by 1, 2 or 3 $C_1$-$C_4$alkyl; phenyl which is unsubstituted or substituted by 1, 2 or 3 $C_1$-$C_4$alkyl; or $C_7$-$C_9$phenylalkyl which is unsubstituted or substituted on the phenyl by 1, 2 or 3 $C_1$-$C_4$alkyl;

when n is 4, Z is a group of the formula (III-a)

(III-a)

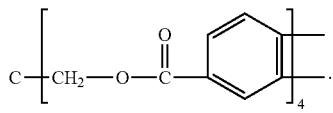

Examples of alkyl having up to 30 carbon atoms are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl and eicosyl. In general, $C_1$-$C_{20}$alkyl, in particular $C_4$-$C_{20}$alkyl or $C_6$-$C_{20}$alkyl is preferred. $Z_1$, $R_1$ and $R_2$ independently of one another are e.g. $C_1$-$C_4$alkyl.

Examples of $C_1$-$C_{30}$alkyloxy are methoxy, ethoxy, propoxy, isopropoxy, n-butoxy, sec-butoxy, isobutoxy, tert-butoxy, 2-ethylbutoxy, n-pentyloxy, isopentyloxy, 1-methylpentyloxy, 1,3-dimethylbutyloxy, n-hexyloxy, 1-methylhexyloxy, n-heptyloxy, isoheptyloxy, 1,1,3,3-tetramethylbutyloxy, 1-methylheptyloxy, 3-methylheptyloxy, n-octyloxy, 2-ethylhexyloxy, 1,1,3-trimethylhexyloxy, 1,1,3,3-tetramethylpentyloxy, nonyloxy, decyloxy, undecyloxy, 1-methylundecyloxy, dodecyloxy, 1,1,3,3,5,5-hexamethylhexyloxy, tridecyloxy, tetradecyloxy, pentadecyloxy, hexadecyloxy, heptadecyloxy, octadecyloxy and eicosyloxy. $C_1$-$C_{20}$alkyloxy is preferred.

Examples of alkenyl having up to 30 carbon atoms are allyl, 2-methallyl, butenyl, pentenyl, hexenyl and oleyl. The carbon atom in position 1 is preferably saturated. $C_3$-$C_{18}$alkenyl is particularly preferred.

Examples of $C_2$-$C_{30}$alkenyloxy are allyloxy, 2-methallyloxy, butenyloxy, pentenyloxy, hexenyloxy and oleyloxy. $C_3$-$C_{18}$alkenyloxy is particularly preferred.

Examples of $C_3$-$C_{12}$cycloalkyl unsubstituted or substituted by 1, 2 or 3 $C_1$-$C_4$alkyl are cyclopentyl, cyclohexyl, cycloheptyl, cyclooctyl, cyclododecyl and 2-methylcyclohexyl. $C_5$-$C_6$cycloalkyl unsubstituted or substituted by methyl are preferred.

Examples of $C_3$-$C_{12}$cycloalkyloxy unsubstituted or substituted by 1, 2 or 3 $C_1$-$C_4$alkyl are cyclopentyloxy, cyclohexyloxy, cycloheptyloxy, cyclooctyloxy, cyclododecyloxy and 2-methylcyclohexyloxy. $C_5$-$C_6$cycloalkyloxy unsubstituted or substituted by methyl are preferred.

Examples of $C_5$-$C_{12}$cycloalkenyl unsubstituted or substituted by 1, 2 or 3 $C_1$-$C_4$alkyl are cyclohexenyl and methylcyclohexenyl.

Examples of $C_6$-$C_{18}$aryl are phenyl and naphthyl which may optionally be substituted. Unsubstituted or substituted phenyl is preferred.

Examples of phenyl substituted by 1, 2 or 3 $C_1$-$C_4$alkyl are 4-methylphenyl, 2-ethylphenyl, 4-ethylphenyl, 4-isopropylphenyl, 4-tert-butylphenyl, 4-sec-butylphenyl, 4-isobutylphenyl, 3,5-dimethylphenyl, 3,4-dimethylphenyl, 2,4-dimethylphenyl, 2,6-diethylphenyl, 2-ethyl-6-methylphenyl and 2,6-diisopropylphenyl.

Examples of $C_6$-$C_{18}$ aryloxy are phenyloxy and naphthyloxy which may optionally be substituted. Phenyloxy unsubstituted or substituted by 1, 2 or 3 $C_1$-$C_4$alkyl is preferred. 4-methylphenyloxy, 2-ethylphenyloxy, 4-ethylphenyloxy, 4-isopropylphenyloxy, 4-tert-butylphenyloxy, 4-secbutylphenyloxy, 4-isobutylphenyloxy, 3,5-dimethylphenyloxy, 3,4-dimethylphenyloxy, 2,4-dimethylphenyloxy, 2,6-diethylphenyloxy, 2-ethyl-6-methylphenyloxy and 2,6-diisopropylphenyloxy are particularly preferred.

An example of diphenylmethyl substituted on the phenyl by 1, 2 or 3 $C_1$-$C_4$alkyl is di[methyl-phenyl]methyl.

An examples of triphenylmethyl substituted on the phenyl by 1, 2 or 3 $C_1$-$C_4$alkyl is tris[methyl-phenyl]methyl.

Examples of $C_7$-$C_9$phenylalkyl unsubstituted or substituted on the phenyl by 1, 2 or 3 $C_1$-$C_4$alkyl are benzyl, 2-phenylethyl, methylbenzyl, dimethylbenzyl, trimethylbenzyl and tert-butylbenzyl.

Examples of acyl having up to 30 carbon atoms are $C_2$-$C_{30}$alkanoyl, $C_3$-$C_{30}$alkenoyl and unsubstituted or substituted benzoyl. $C_2$-$C_{20}$alkanoyl, $C_3$-$C_{20}$alkenoyl and substituted benzoyl are preferred. Acetyl, propionyl, butyryl, pentanoyl, hexanoyl, octanoyl, benzoyl, acryloyl and crotonoyl are more specific examples. A group of the formula

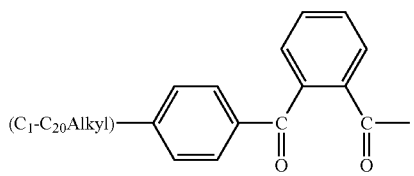

as well as $C_2$-$C_{20}$alkanoyl and $C_3$-$C_{20}$alkenoyl are particularly preferred.

A preferred example of $C_1$-$C_{30}$sulfonyl is the group

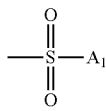

wherein $A_1$ is $C_1$-$C_{30}$alkyl, $C_3$-$C_{30}$alkenyl, $C_3$-$C_{12}$cycloalkyl which is unsubstituted or substituted by 1, 2 or 3 $C_1$-$C_4$alkyl; phenyl unsubstituted or substituted by 1, 2 or 3 $C_1$-$C_{20}$alkyl; or $C_7$-$C_9$phenylalkyl which is unsubstituted or substituted on the phenyl by 1, 2 or 3 $C_1$-$C_4$alkyl. A particularly preferred radical is

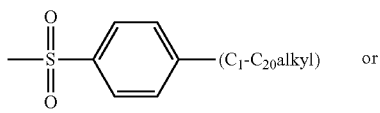

or

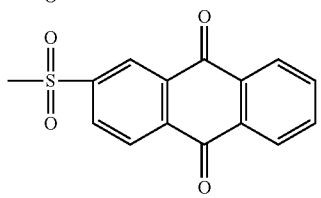

which may optionally be substituted. Further examples of sulfonyl are

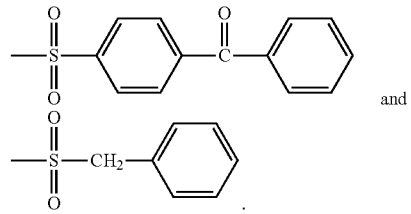

and

Examples of a bicyclic or tricyclic hydrocarbyl having 6 to 10 carbon atoms are

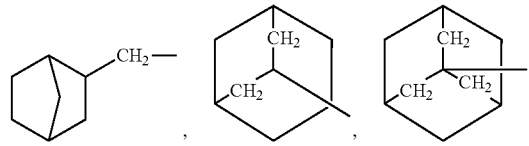

A preferred example of $C_2$-$C_{30}$carboxylate is the group

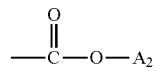

wherein $A_2$ is $C_1$-$C_{29}$alkyl, $C_3$-$C_{18}$alkenyl, $C_3$-$C_{12}$cycloalkyl which is unsubstituted or substituted by 1, 2 or 3 $C_1$-$C_4$alkyl; phenyl unsubstituted or substituted by 1, 2 or 3 $C_1$-$C_4$alkyl; or $C_7$-$C_9$phenylalkyl which is unsubstituted or substituted on the phenyl by 1, 2 or 3 $C_1$-$C_4$alkyl.

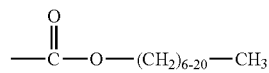

is particularly preferred.

A preferred example of $C_2$-$C_{30}$carboxamide is the group

wherein A'2 has one of the definitions of $A_2$

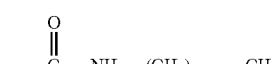

is particularly preferred.

Examples of $C_2$-$C_{30}$acyloxy are $C_2$-$C_{20}$alkanoyloxy, $C_3$-$C_{20}$alkenoyloxy and substituted benzoyloxy are preferred. Acetyloxy, propionyloxy, butyryloxy, pentanoyloxy, hexanoyloxy, octanoyloxy, benzoyloxy, acryloyloxy and crotonoyloxy are more specific examples. $C_2$-$C_{20}$alkanoyloxy, $C_3$-$C_{20}$alkenoyloxy and benzoyloxy are particularly preferred.

A preferred example of $C_3$-$C_{30}$diacyl is the group

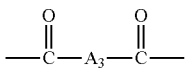

wherein $A_3$ is $C_2$-$C_{20}$alkylene, $C_2$-$C_{20}$alkylene interrupted by oxygen, sulphur or >N—$R_3$ with $R_3$ having one of the meanings of $R_1$; $C_2$-$C_{12}$alkenylene, $C_2$-$C_{12}$alkynylene, $C_5$-$C_{12}$cycloalkylene, $C_5$-$C_{12}$cycloalkylene-($C_1$-$C_4$alkylene)-$C_5$-$C_{12}$cycloalkylene, $C_1$-$C_4$alkylene-($C_5$-$C_{12}$cycloalkylene)-$C_1$-$C_4$alkylene, phenylene, phenylene-($C_1$-$C_4$alkylene)-phenylene or $C_1$-$C_4$alkylene-phenylene-$C_1$-$C_4$alkylene.

A preferred example of $C_3$-$C_{30}$di(acyloxy) is the group

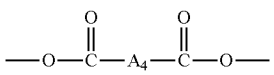

wherein $A_4$ has one of the definitions of $A_3$.

A preferred example of $C_3$-$C_{45}$dicarboxylate is the group

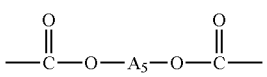

wherein $A_5$ has one of the definitions of $A_3$. A further preferred example is

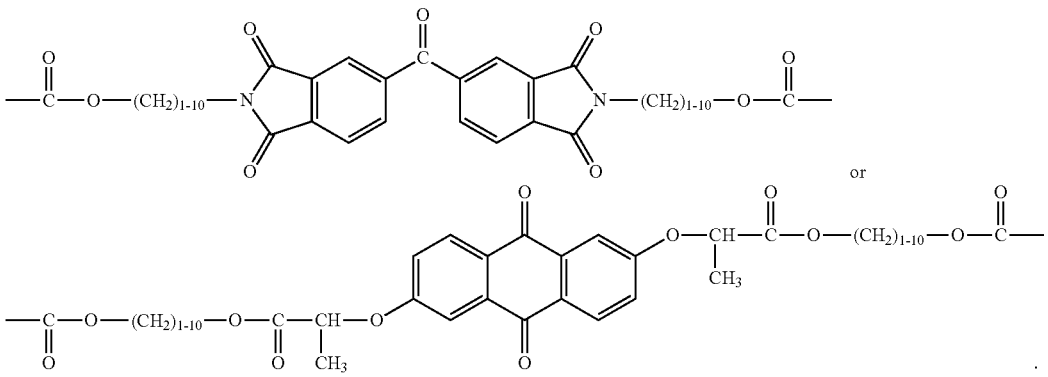

A preferred example of $C_3$-$C_{45}$di(carboxamide) is the group

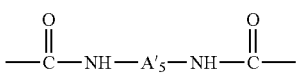

wherein $A'_5$ has one of the definitions of $A_3$.

A preferred example of diamine is the group

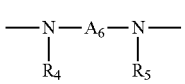

wherein $R_4$ and $R_5$ independently of one another have one of the meanings of $R_1$ and $A_6$ has one of the meanings of $A_3$.

A preferred example of diamide is the group

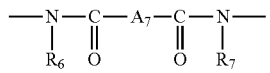

wherein $R_6$ and $R_7$ independently of one another have one of the definitions of $R_1$ and $A_7$ has one of the definitions of $A_3$.

Examples of alkylene having up to 20 carbon atoms are ethylene, propylene, trimethylene, tetramethylene, pentamethylene, hexamethylene, octamethylene, decamethylene and dodecamethylene.

Examples of alkylene having up to 20 carbon atoms and being interrupted by oxygen, sulphur or >N—$R_3$ are 3-oxapentane-1,5-diyl, 4-oxaheptane-1,7-diyl, 3,6-dioxaoctane-1,8-diyl, 4,7-dioxadecane-1,10-diyl, 4,9-dioxadodecane-1,12-diyl, 3,6,9-trioxaundecane-1,11-diyl, 4,7,10-trioxatridecane-1,13-diyl, 3-thiapentane-1,5-diyl, 4-thiaheptane-1,7-diyl, 3,6-dithiaoctane-1,8-diyl, 4,7-dithiadecane-1,10-diyl, 4,9-dithiadodecane-1,12-diyl, 3,6,9-trithiaundecane-1,11-diyl, 4,7,10-trithiatridecane-1,13-diyl and —$CH_2CH_2CH_2$—N($R_3$)—$CH_2CH_2$—N($R_3$)—$CH_2CH_2CH_2$—, in particular —$CH_2CH_2CH_2$—N($CH_3$)—$CH_2CH_2$—N($CH_3$)—$CH_2CH_2CH_2$—.

An example of $C_2$-$C_{12}$alkenylene is 3-hexenylene.

An example of $C_2$-$C_{12}$alkynylene is

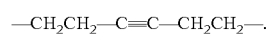

$C_6$-$C_{12}$alkynylene is preferred.

An example of $C_5$-$C_{12}$cycloalkylene is cyclohexylene.

Examples of $C_5$-$C_{12}$cycloalkylene-($C_1$-$C_4$alkylene)-$C_5$-$C_{12}$cycloalkylene are methylenedicyclohexylene and isopropylidenedicyclohexylene.

An example of $C_1$-$C_4$alkylene-($C_5$-$C_{12}$cycloalkylene)-$C_1$-$C_4$alkylene is cyclohexylenedimethylene.

An example of phenylene-($C_1$-$C_4$alkylene)-phenylene is methylenediphenylene.

An example of $C_1$-$C_4$alkylene-phenylene-$C_1$-$C_4$alkylene is phenylenedimethylene.

Preferred examples of the radical X are >C=O, >S(O)$_2$, >CH$_2$, >C(CH$_3$)$_2$ and >C(phenyl)$_2$.

X as >C=O is particularly preferred.

n is preferably 1 or 2,

For n=1, Z is preferably a group of the formula (I-a) or (I-d), and for n=2, Z is preferably a group of the formula (II-a) or (II-c).

A preferred example of the group (I-a) is the residue of the formula (I-a-1).

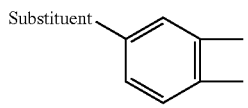
(I-a-1)

Particularly preferred embodiments of the present invention are:

1) A polymer article as defined above, wherein Y is hydrogen and
when n is 1, Z is a group of the formula (I-b), (I-c), (I-d), (I-j), (I-k), (I-l), (I-n) or (I-m), and
when n is 2, Z is a group of the formula (II-a), (II-b), (II-c) or (II-d).

2) A polymer article as defined above, wherein
when n is 1, Z is a group of the formula (I-a) unsubstituted or substituted by $C_2$-$C_{30}$carboxylate or $C_2$-$C_{30}$carboxamide; and
when n is 2, Z is a group of the formula (II-a) or (II-c).

3) A polymer article as defined above, wherein
when n is 1, Z is a group of the formula (I-a) substituted on the aromatic ring by —COOH, an $C_8$-$C_{22}$alkylcarboxylate of the formula

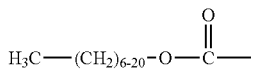

or an $C_8$-$C_{22}$alkylcarboxamide of the formula

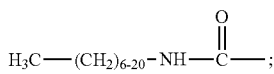

or a group of the formula (I-d); and
when n is 2, Z is a group of the formula (II-c) wherein $Z_2$ is a dicarboxylate of the formula

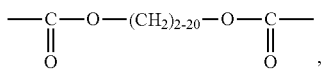

or a di(carboxamide) of the formula

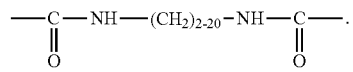

4) A polymer article as defined above, wherein Y is $C_1$-$C_{30}$alkyl, $C_7$-$C_9$phenylalkyl unsubstituted or substituted on the phenyl by 1, 2 or 3 $C_1$-$C_4$alkyl; triphenylmethyl unsubstituted or substituted on the phenyl by 1, 2 or 3 $C_1$-$C_4$alkyl; $C_2$-$C_{30}$acyl, —COOY$_0$, $C_1$-$C_{30}$sulfonyl or —Si(Y$_1$)$_3$; and Y$_0$ and Y$_1$ are $C_1$-$C_{18}$alkyl or phenyl which is unsubstituted or substituted by 1, 2 or 3 $C_1$-$C_4$alkyl.

5) A polymer article as defined above, wherein n is 1 or 2, and
when n is 1, Z is a group of the formula (I-a) or (I-d), the aromatic rings of the formula (I-a) or (I-d) are optionally substituted by $C_2$-$C_{30}$carboxylate or —COOH;
when n is 2, Z is a group of the formula (II-a) or (II-c), and $Z_2$ is >C=O or $C_3$-$C_{45}$dicarboxylate.

6) A polymer article as defined above, wherein
n is 1 or 2;
Y is $C_1$-$C_{30}$alkyl, triphenylmethyl, benzyl, $C_2$-$C_{30}$alkanoyl,

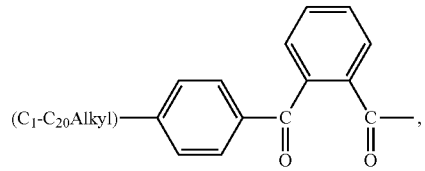

—COOY$_0$ with Y$_0$ being $C_1$-$C_{18}$alkyl; tosyl or tert-butyldiphenylsilanyl, and when n is 2, Y is additionally hydrogen;
when n is 1, Z is a group of the formula

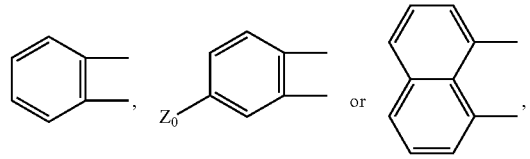

$Z_0$ is COOH or —COO—($C_1$-$C_{20}$alkyl);

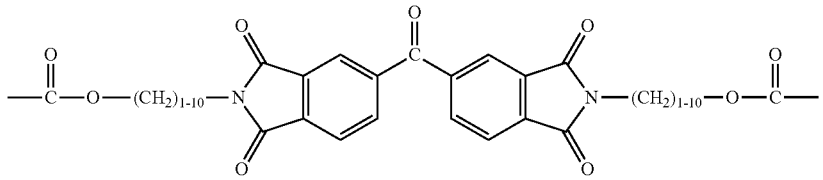

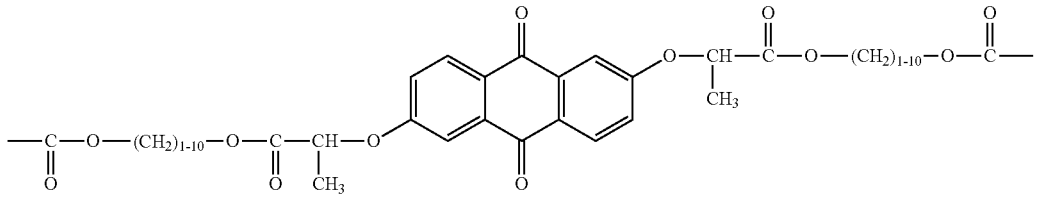

when n is 2, Z is a group of the formula

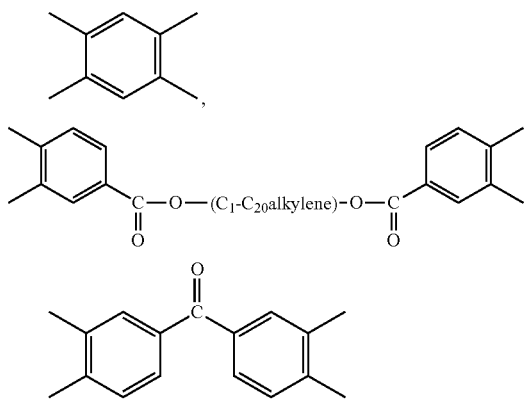

7) A polymer article as defined above, wherein component (B) is a compound of the formula

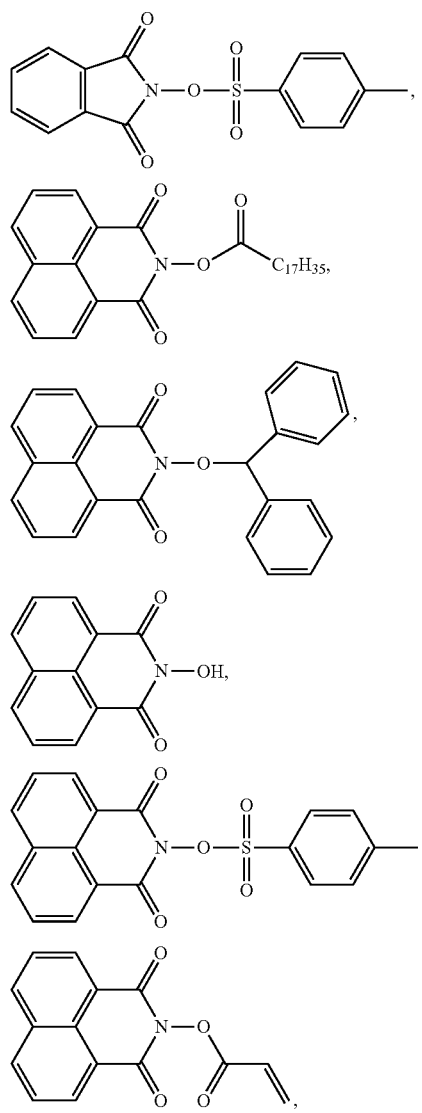

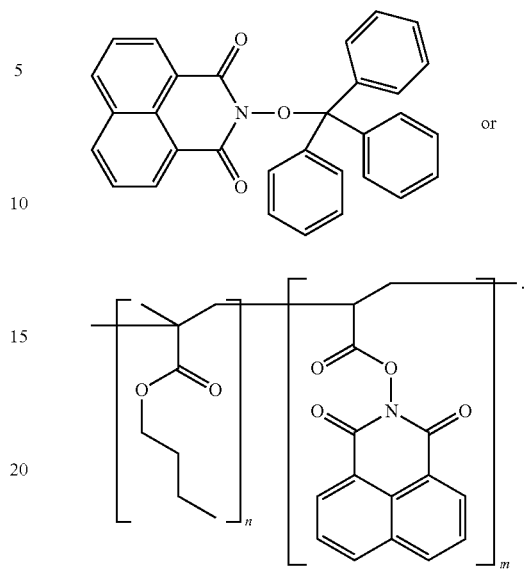

$n : m = 1 : 6$

The synthesis of the cited examples is best carried out as described in the following Examples. The examples illustrate the invention in greater detail. All percentages and parts are by weight, unless stated otherwise.

Incorporation of the various additives is best performed in a thermal compounding step, mixing thoroughly the oxidation additives and optional additives, followed by an extrusion of the physical blend at elevated temperature. Typically an extruder with suitable screw configuration is used for this step. The additives can also be added in the form of a preconfectioned masterbatch produced in a different manner. For the production of the desired article any appropriate machine can be used, depending on the final form of the article, for example a blow extruder in the case of films, a cast extrusion machine in the case of sheets or an injection-molding machine.

Oxidant Additives: Accessibility of the Starting Materials:
Starting materials for the cited examples 1-6 are commercially available compounds, for example
N-hydroxy phthalimide
Pyromellitic dianhydride
Phthalic anhydride
N-dodecylbenzene
Hydroxylamine hydrochloride
Manganese stearate
Poly-alpha-pinene
Poly-beta-pinene
Poly limonene
Other base nuclei that can be used are:
Trimellitic anhydride anhydride
N-hydroxy1,8-phthalimide
Perylene tetracarboxylic acid
Saccharin
Modifications were carried out with commercially available compounds such as
stearoyl chloride
p-toluenesulfonyl chloride
trityl chloride

| Example | 1 |
|---|---|
| Structure | 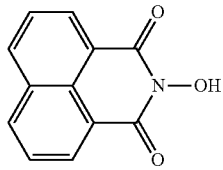 [SMILES: O=C1c2cccc3cccc(c23)C(=O)N1O] |

Melting point 285-288° C.
MW (g/mol) 213.19
Data of thermogravimetric analysis/ weight loss
210° C.: 0.34%
260° C.: 2.92%
300° C.: 21.41%

| Example | 2 |
|---|---|
| Structure | 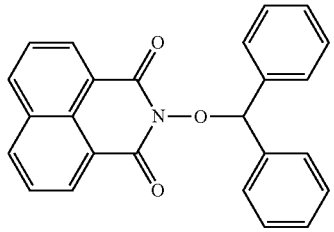 [SMILES: O=C1c2cccc3cccc(c23)C(=O)N1OC(c1ccccc1)c1ccccc1] |

Melting point 209-216° C.
MW (g/mol) 379.42
Data of thermogravimetric analysis/ weight loss
210° C.: 0.23%
260° C.: 1.35%
300° C.: 11.11%

| Example | 3 |
|---|---|
| Structure | 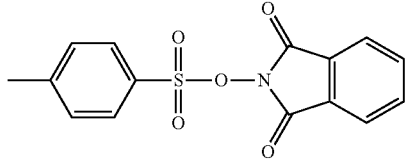 [SMILES: Cc1ccc(S(=O)(=O)ON2C(=O)c3ccccc3C2=O)cc1] |

Melting point 157-164° C.
MW (g/mol) 317.32
Data of thermogravimetric analysis/ weight loss
210° C.: 0.80%
260° C.: 3.92%
300° C.: 59.62%

| Example | 4 |
|---|---|
| Structure | 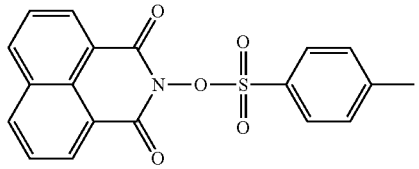 [SMILES: Cc1ccc(S(=O)(=O)ON2C(=O)c3cccc4cccc(c34)C2=O)cc1] |

Melting point 232-239° C.
MW (g/mol) 367.38
Data of thermogravimetric analysis/ weight loss
210° C.: 0.18%
260° C.: 0.24%
300° C.: 28.86%

-continued

| Example | 5 |
|---|---|
| Structure | 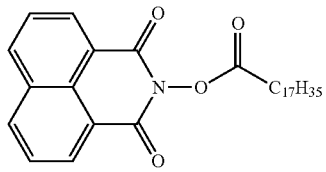 |

Melting point 76-81° C.
MW (g/mol) 479.67
Data of thermogravimetric analysis/ weight loss
210° C.: 0.01%
260° C.: 2.24%
300° C.: 19.68%

| Example | 6 |
|---|---|
| Structure | 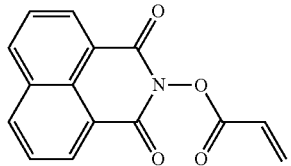 [SMILES: C=CC(=O)ON1C(=O)c2cccc3cccc(c23)C1=O] |

Melting point 159-166° C.
MW (g/mol) 276.24
Data of thermogravimetric analysis/ weight loss
210° C.: 1.24%
260° C.: 3.23%
300° C.: 7.81%

| Example | 7 |
|---|---|
| Structure | 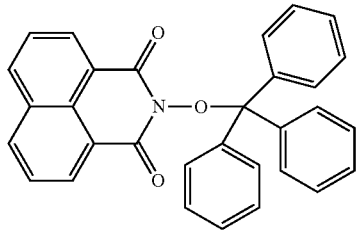 [SMILES: O=C1c2cccc3cccc(c23)C(=O)N1OC(c1ccccc1)(c1ccccc1)c1ccccc1] |

Melting point 274-277° C.
MW (g/mol) 455.52
Data of thermogravimetric analysis/ weight loss
210° C.: 0.11%
260° C.: 2.16%
300° C.: 13.86%

| Example | 8 |
|---|---|
| Structure | 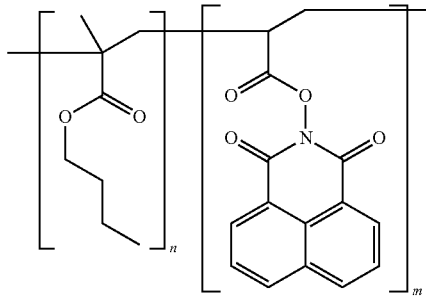 | n:m = 1:6

Melting point 94-98° C.
MW (g/mol) Mn: 4043; Mw: 7432

| | |
|---|---|
| Data of thermogravimetric analysis/ weight loss | 210° C.: 1.28%<br>260° C.: 6.19%<br>300° C.: 43.39% |

Compounds of the following Examples 1, 3 and 5 have been prepared following procedures disclosed in the WO 2007/028731 A1

Example 2

Di Phenyloxy-1,8-Naphthalimide

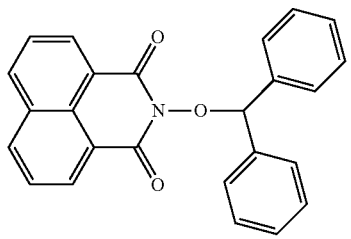 [SMILES: O=C1c2cccc3cccc(c23)C(=O)N1OC(c1ccccc1)c1ccccc1]

A four-necked round-bottom flask equipped with a mechanical stirrer, thermocouple, dropping funnel and condenser is successively charged with 200 ml of DMA, 17.8 g of triethylamine and 24.9 g of diphenylchloromethane and 25 g of N-hydroxy-1,8-naphthalimide. The stirred mixture is then heated up at 90° C. for 8 hours. The reaction mixture is then cooled down at room temperature and the precipitate is separated by filtering off the solution, washed with water several times and dried in oven under vacuum at 100° C. The product is obtained as a white solid.

Example 4

N-p-Toluene-4-Sulfonyloxynaphthalimide

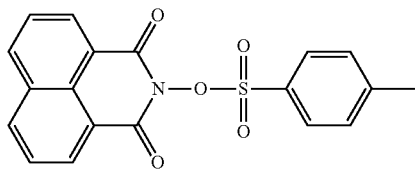

A four-necked round-bottom flask equipped with a mechanical stirrer, thermocouple, dropping funnel and condenser is successively charged with 200 ml of THF, 17.8 g of triethylamine and 25 g of N-hydroxy-1,8-naphthalimide. To this stirred mixture is then slowly added, at room temperature, 23.5 g of p-toluenesulfonyl chloride; the reaction is then heated at reflux for 4 hours. The reaction mixture is then cooled down at room temperature; the precipitate is separated by filtering off the solution, washed with water several times and dried in oven under vacuum at 100° C. The product is obtained as a white solid.

Example 6

Acrylox-1,8-Naphthalimide

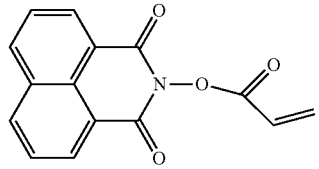 [SMILES: C=CC(=O)ON1C(=O)c2cccc3cccc(c23)C1=O]

A four-necked round-bottom flask equipped with a mechanical stirrer, thermocouple, dropping funnel and condenser is successively charged with 500 ml of THF, 11.44 g of triethylamine and 20 g of N-hydroxy-1,8-naphthalimide. 9.34 g of Acryloyl chloride are slowly added to the mixture and the reaction is stirred at room temperature for 16 hours. The white precipitate is filtered off and the solvent removed under reduce pressure to give an orange solid which is crystallized from 200 mL of isopropanol as a white solid and dried in oven under vacuum at 100° C.

Example 7

Tri-(Trityloxy)-1,8-Naphthalimide

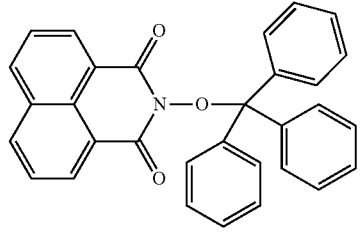 [SMILES: O=C1c2cccc3cccc(c23)C(=O)N1OC(c1ccccc1)(c1ccccc1)c1ccccc1]

A four-necked round-bottom flask equipped with a mechanical stirrer, thermocouple, dropping funnel and condenser is successively charged with 25.0 g N-hydroxy-1,8-naphthalimide, 17.76 g of triethylamine in 200 ml of DMF. 32.69 g of Trityl chloride are slowly added to the mixture and the reaction is stirred at room temperature for 16 hours. The white precipitate is filtered and washed with $H_2O$, hexane, THF and finally dried in oven under vacuum at 100° C.

Example 8

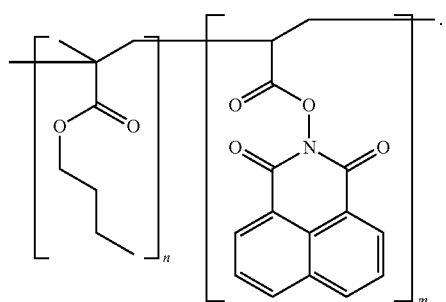

$n : m = 1 : 6$

A four-necked round-bottom flask equipped with a mechanical stirrer, thermocouple, dropping funnel and condenser is successively charged with 20.0 g of compound 6, 63.86 g of butyl methacrylate and 4.0 g of AIBN in 400 ml of THF. The mixture is heated at reflux for 4 hours. The solvent is then removed and the solid dissolved in 400 ml of $CH_2Cl_2$, washed with $H_2O$ and the organic phase dried over $Na_2SO_4$. The solvent is removed to give a light yellow solid which is washed with 100 ml of cold MeOH and finally dried in oven under vacuum at 90° C.

Riblene GP20® low density polyethylene has been obtained from Polimeri Europa; Dercolyte is a poly terpene product obtain from Les Dérivés Résiniques & Terpéniques; Manganese Stearate, $Mn(C_{18}H_{35}O_2)_x$, has been purchased from Shepherd Chemical Company and Shelfplus $O_2$ 2400® has been obtain from ALBIS.

Comparative Sample 1:

Shelfplus $O_2$ 2400® was mixed in a 1:1 ratio with low density polyethylene, Riblene® so that the final Iron concentration was 5.0% by weight. Compounds were prepared with an OMC pilot double screw extruder (model EBV 19/25, with a 19 mm screw diameter and 1:25 ratio), and 50 micron-thick films were prepared using Collin Cast Flat-die Extruder model 30×25 L/D (30 mm screw diameter, 1:25 diameter/length ratio).

Comparative Sample 2:

2.0% of polyterpenic resin Dercolyte® was mixed with low density polyethylene, Riblene®. Compounds and Film were prepared as described in Comparative Sample 1.

Comparative Sample 3:

0.2% of Manganese Stearate was mixed with low density polyethylene, Riblene®. Compounds and Film were prepared as described in Comparative Sample 1.

Inventive Sample 4:

2.0% of polyterpenic resin Dercolyte®, 0.2% of Manganese Stearate and 0.2% of Example 2 were mixed with low density polyethylene, Riblene®. Compounds and Film were prepared as described in Comparative Sample 1.

Inventive Sample 5:

2.0% of polyterpenic resin Dercolyte®, 0.2% of Manganese Stearate and 0.2% of Example 3 were mixed with low density polyethylene, Riblene®. Compounds and Film were prepared as described in Comparative Sample 1.

Inventive Sample 6:

2.0% of polyterpenic resin Dercolyte®, 0.2% of Manganese Stearate and 0.2% of Example 4 were mixed with low density polyethylene, Riblene®. Compounds and Film were prepared as described in Comparative Sample 1.

Inventive Sample 7:

2.0% of polyterpenic resin Dercolyte®, 0.2% of Manganese Stearate and 0.2% of Example 5 were mixed with low density polyethylene, Riblene. Compounds and film were prepared as described in Comparative Sample 1.

Inventive Sample 8:

2.0% of polyterpenic resin Dercolyte®, 0.2% of Manganese Stearate and 0.2% of Example 7 were mixed with low density polyethylene, Riblene®. Compounds and Film were prepared as described in Comparative Sample 1.

Inventive Sample 9:

2.0% of polyterpenic resin Dercolyte®, 0.2% of Manganese Stearate and 0.45% of Example 8 were mixed with low density polyethylene, Riblene®. Compounds and Film were prepared as described in Comparative Sample 1.

Inventive Sample 10:

2.0% of polyterpenic resin Dercolyte® and 0.2% of Manganese Stearate were mixed with low density polyethylene, Riblene®. Compounds and Film were prepared as described in Comparative Sample 1.

Several aliquots of film for each sample were then exposed to air (20.7% $O_2$) in 500 ml sealed flasks provided with a septum that allowed portions of the inside atmosphere to be drawn for analysis at several intervals using a syringe. Oxygen concentration measures were carried out using a Mocon Pac Check 450 head space analyzer over 28 days. The actual iron concentration in Comparative Sample 1 was measured by ICP-OES (Inductively Coupled Plasma—Optical Emission Spectrometer, Perkin Elmer Optima Series 4200DV). The results in terms of ml $O_2$/g of active scavenger are given in Table 1.

TABLE 1

Averaged oxygen scavenger activity (ml $O_2$/g Scavenger) for six different LDPE film measured after 28 days. In case of Comparative Sample 1*: g of active scavenger = g. of iron in the film; in all the other cases: g. of active scavenger = g. of Dercolyte + g. of metal complex + g. of nitroxyl molecule.

| | ml $O_2$/g. Iron after 28 Days |
|---|---|
| Comparative Sample 1* | 36 |
| Comparative Sample 2 | No $O_2$ uptake detectable |
| Comparative Sample 3 | No $O_2$ uptake detectable |
| Inventive Sample 4 | 92 |
| Inventive Sample 5 | 83 |
| Inventive Sample 6 | 72 |
| Inventive Sample 7 | 97 |
| Inventive Sample 8 | 53 |
| Inventive Sample 9 | 88 |
| Inventive Sample 10 | 69 |

Description of Oxygen Uptake Method:

Film thickness is measured and 4.0 grams of film are weighted. The extruded film is folded and placed in a clean 500 ml sealed glass container. A vial containing 15 ml of deionized water is added to produce 100% relative humidity inside the glass container (only for Comparative Sample 1).

The oxygen content in the ambient air on day 0 (i.e. equal to the initial oxygen content in the sealed glass container) is tested and recorded using a Mocon Oxygen Analyzer.

The glass containers with test films and water vials are stored at 22° C. (generally, room temperature) for 28 days.

The oxygen content in the sealed glass containers using a Mocon Oxygen Analyzer on day 28 are tested and recorded.

Based on the measured oxygen concentration that is left in the sealed glass container the volume of oxygen absorbed per gram of Scavenger has been calculated using the formula:

$$\text{Oxygen absorbed (ml/g)} = \{(\% O_2)_i - (\% O_2)_f\} * 0.01 * V_f / (W_F * W_S / W_B)$$

where:

(% $O_2$)$_i$ Initial oxygen concentration in the sealed glass container (%)

(% $O_2$)$_f$ Oxygen concentration in the sealed glass container at day of test (%)

0.01: Conversion factor $V_f$: Free air volume of the sealed glass container (ml) (total volume of the sealed glass container less space occupied by vial and film, typically 440 ml)

$W_F$: Weight of film placed into the glass container (typically 4.0 g)

$W_S$: Weight of Oxygen Scavenger used to make blend (g)

$W_B$: Total weight of blend (g)

The invention can be applied in all areas of packaging where oxygen scavenger activity is desired.

For example, the polymer article may be used to manufacture plastic films, sheets, laminates, bags, bottles, styrofoam cups, utensils, blister packages, boxes, package wrappings. The articles may be manufactured by any process available to those of ordinary skill in the art including, but

The invention claimed is:

1. A method for maintaining or reducing oxygen levels in packaged items, which method comprises including an oxygen-scavenging composition in the package, the composition comprising
(I) a polymeric resin,
(II) an organic oxidation additive that is:

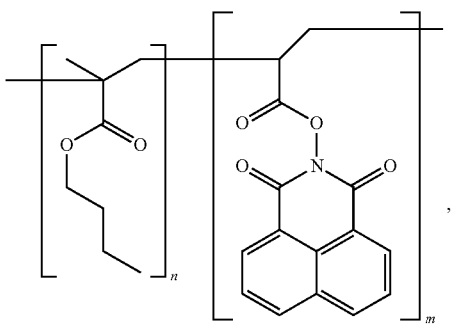

n:m = 1:6

(III) a metal salt,
(IV) a sacrificial oxidizable substrate,
and optionally,
(V) an additional component;
with the proviso that components (I) and (IV) are different.

2. The method of claim 1, wherein
component (II) is present in an amount of 0.001-10 wt %, based on the polymeric resin,
component (III) is present in an amount of 0.001-10 wt %, based on the polymeric resin,
component (IV) is present in an amount of 0.001-10 wt %, based on the polymeric resin,
and optionally, component (V) is present in an amount of 0.001-10 wt %, based on the polymeric resin.

3. The method of claim 1, wherein the polymeric resin is a thermoplastic polymer selected from the group consisting of a homopolymer of an olefin monomer, a copolymers of a olefin monomer, a copolymer of an olefin monomer with a diolefin monomer, a cyclic olefin, a copolymer of one or more 1-olefins or diolefins with carbon monoxide, a copolymer of one or more 1-olefins and diolefins with carbon monoxide and polyvinyl alcohol.

4. The method of claim 1, wherein the metal salt is a Co, Ce, Mn, Cu, Ni, or Vd salt.

5. The method of claim 1, wherein the sacrificial oxidizable substrate is selected from the group consisting of polybutadiene, polyester, squalane, squalene, polystyrene, poly-limonene, poly alpha pinene, poly beta pinene, polynorbornene, polylactic acid and a mixture of linear and branched alkyl chain $C_6$-$C_{30}$ alcohols.

6. The method of claim 1, wherein the sacrificial oxidizable substrate is a polyterpenic resin.

7. The method of claim 1, wherein the oxygen-scavenging composition further comprises one or more additional components selected from the group consisting of a filler, a reinforcing agent, a pigment, a light stabilizer, an antioxidant, an antislip additive, an antblock additive, a plasticizer, an optical brightener, an antistatic agent and a blowing agent.

8. The method of claim 1, wherein the packaged item is a food packaging.

* * * * *